March 3, 1959  H. PRÄHAUSER ET AL  2,875,875
ELECTROMAGNETIC CLUTCH FOR USE ON A SHAFT
Filed Nov. 8, 1954  2 Sheets-Sheet 1

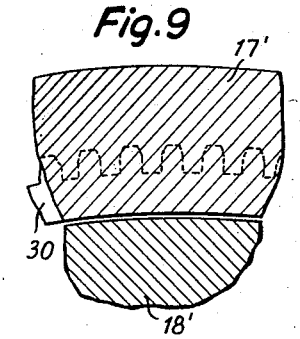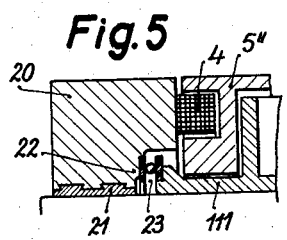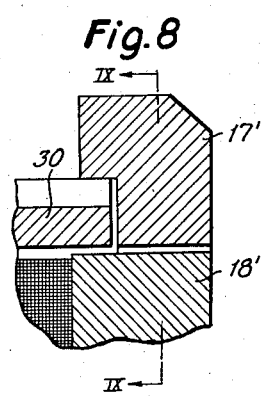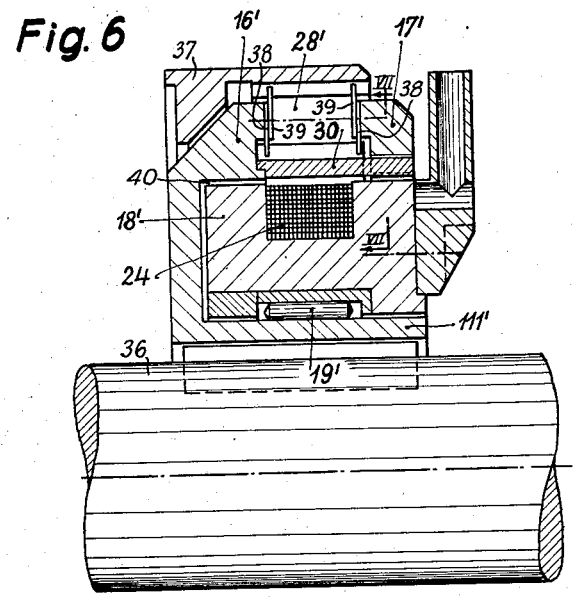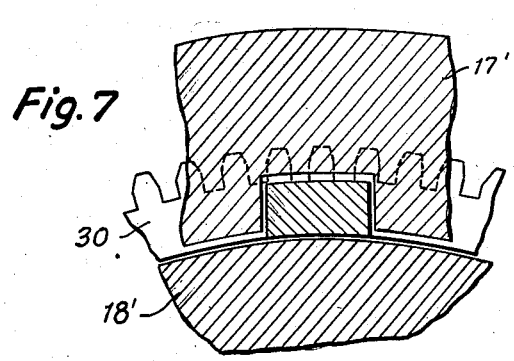

United States Patent Office 2,875,875
Patented Mar. 3, 1959

2,875,875

ELECTROMAGNETIC CLUTCH FOR USE ON A SHAFT

Heinrich Prähauser, Vienna-Langenzersdorf, and Johann Petschauer, Vienna, Austria, assignors to Maschinenfabrik Heid Aktiengesellschaft, Vienna, Austria, a joint-stock company of Austria Application November 8, 1954, Serial No. 467,476

Claims priority, application Austria November 14, 1953

2 Claims. (Cl. 192—84)

This invention relates to electromagnetic laminated-disc clutches, and other electromagnetic clutches of the kind comprising a fixed magnet part which is arranged concentrically to the axis of the shaft and mounted on the shaft without the interposition of a part fixed in place, a magnet coil secured on the fixed magnet part, and an axially displaceable magnet part or armature which is arranged to act upon the clutch, more particularly on the pile of laminated discs.

It is an object of the present invention to provide improved clutches of this kind which are of simple construction including fixed current supply means without slip rings and without endangering the coil by centrifugal forces, and constructed in such manner that the flow of mechanical force produced by the coupling forces will not act upon the shaft thus relieving the shaft of strain and permitting the holding of the stationary magnet part to be effected without attachment to the housing or wall elements, so that the clutch can be plugged as one unit upon the shaft or shafts.

A subsidiary object is to provide a construction which is economical in space, being of short constructional length and little constructional height while providing large bearing and guide surfaces for the axially displaceable rotary magnet part.

The invention is essentially characterised by the fact that the armature is mounted in an axially displaceable manner upon the clutch member which carries one of the clutch elements or one half of the pile of laminated-discs and is provided with a hub which in a manner known per se is fixedly arranged upon the shaft. In one form of embodiment the armature is axially displaceably mounted upon the hub of the clutch member. In another embodiment the armature is constituted by a ring which is axially displaceably mounted upon the clutch member. In this case no active air gap of variable cross-section which normally is situated within the magnetic flux and extends approximately perpendicularly to the axis of the shaft, is provided when the clutch is engaged. On the contrary there remain two inactive air gaps the cross-sections of which are fixed and which extend parallel to the axis of the shaft.

Compared with customary electromagnetic clutches, the clutch according to the invention produces an increased coupling effect even when carried out in small dimensions since clutch discs of greater diameter are applicable than customary with clutches of similar size. Moreover the machining of the shaft is simpler, due to greater tolerances, since no displaceable clutch body for sliding on the shaft is provided.

The armature is not relied upon for the transmission of the torque, and therefore need not be connected with the associated clutch member against torque.

In an embodiment of the clutch according to the invention which is particularly economical in space, the fixed magnet member is mounted on the hub or on the shaft. The magnet coil may be arranged in a manner known per se in cantilever fashion on the fixed magnet member and be surrounded by the armature or the coupling member.

Examples of execution of the idea of the various electromagnetic laminated disc clutches embodying the invention are illustrated in the accompanying drawings.

Fig. 1 shows the arrangement of a clutch on a through shaft with a gear wheel as the driving or driven member, the pile of discs being arranged laterally of the magnet coil.

Figs. 2 and 3, and Fig. 4 respectively show two different embodiments of clutches in which the pile of discs is arranged around the outer side of the magnet coil, Fig. 3 being a cross-section on lines III—III of Fig. 2 seen in the direction of the arrows.

In each of Figs. 1, 2 and 4 the part above the axis of the shaft is shown in section and the part below said axis in elevation.

Fig. 5 shows a detail of a modified embodiment,

Fig. 6 shows a further embodiment, somewhat similar to that of Fig. 4, in a sectional elevation only the part arranged above the axis of the shaft being represented, Figure 7 is a cross-sectional view on line VII—VII of Figure 6, with portions broken off;

Figure 8 is a cross-sectional view of a detail of a modified construction of Figure 6, with parts broken off;

Figure 9 is a cross-sectional view of a detail of Figure 8, with parts broken off.

Figure 1:
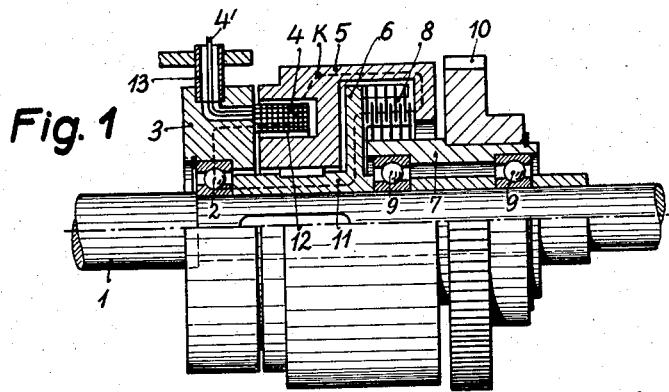

Referring first to Fig. 1, 3 represents the fixed magnet member of the clutch, which is mounted direct upon a through shaft 1 by means of a ball bearing 2. A magnet coil 4 is secured in cantilever fashion on the magnet member 3 and is enclosed by an armature which is rotatable and axially displaceable, and which rotates around the coil 4. 6 and 7 indicate respectively the two clutch members which carry the pile of discs 8, the outer discs being inserted in serrations of the first clutch member 6 and the inner discs being inserted in serrations of the clutch member 7 in an axially displaceable manner. The second clutch member 7, which is mounted on the shaft 1 by means of ball bearings 9, carries a gear wheel 10 which constitutes the driving or the driven element. The clutch member 6 has a sleeve-like hub 11 which is connected with the shaft for common rotation therewith, and is supported against the magnet member 3 at the bearing 2 thereof. The armature 5 is mounted on the shaft so as to be prevented from rotation relative to the shaft but free to be axially displaced thereon. Its bearing surface can be made large since the part of the armature 5 which is provided with the bearing and guide surfaces may extend along the exposed coil surface 12. The armature 5 encircles the pile of discs 8 and compresses it so that coupling is effected between the shaft 1 and the gear wheel 10 through the hub 11, the first clutch member 6, the pile of discs 8, and the second clutch member 7. When the clutch is engaged, the mechanical flow of forces extends through the fixed magnet member 3, across the coil 4, through the armature 5, the pile of discs 8, the clutch member 6, the hub 11, the ball bearing 2, and back to the magnet member 3, as indicated by the broken line K. Axial forces produced during the coupling operation are accordingly not transmitted to the shaft. The torque to be transmitted is conducted e. g. from the shaft 1 through the clutch member 6, clutch discs 8, to the clutch member 7, which is connected for common rotation with the gear wheel 10. Transmission may obviously alternatively take place in the opposite direction. The armature which produces the coupling operation is not relied upon for the transmission of the torque, and therefore need not be connected with the hub 11 against torque. The magnetic flux extends around the coil 4 through the fixed magnet member 3 and the armature 5.

The supply of current is effected through a bush 13, the holding of the magnet part 3 by the current supply conductors 4' being sufficient in view of the fact that the bearing friction which tends to produce rotation of the magnet member 3, is low not only when the clutch is disengaged but also when it is engaged, more particularly when ball bearings are employed. In order however to relieve the conductors of these forces, the magnet member may be held by the bush 13. This allows the clutch to be plugged as a unit at any desired point of a shaft without the position of the clutch being determined by elements which are fixed in position.

Figure 2:
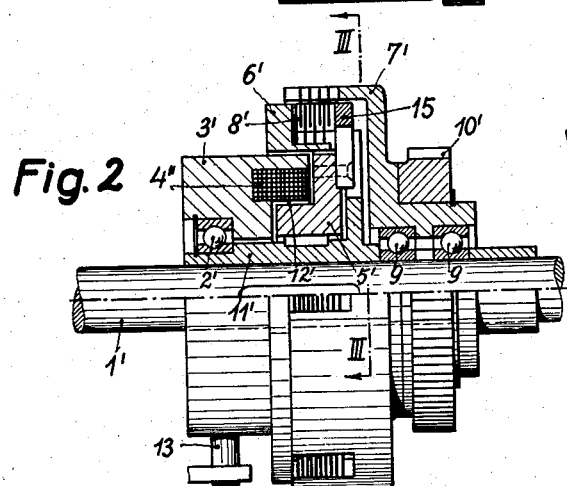
Figure 3:
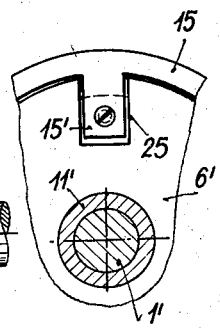

In the construction according to Fig. 2 the pile of discs 8' of the clutch is arranged at the outer side of the coil 4". A ring 15 connected with the armature 5' by arms 15' (Fig. 3) which extend through recesses 25 of the clutch member 6', serves to exert pressure upon the pile of discs 8' when the clutch is engaged. The second clutch member is designated here as 7'. The flow of mechanical forces extends through the fixed magnet member 3', across the coil 4", through the armature 5', the ring 15, the pile of discs 8', the clutch member 6', the hub 11' and the ball bearing 2', back to the magnet member 3'. The magnetic flux extends similarly as in the embodiment of Fig. 1. A feature of the embodiment of Figs. 2 and 3 which is different from the embodiment of Fig. 1 is the fact that the fixed magnet member 3', encloses the coil 4" at its outer side throughout its length and at its inner side for part of its length. Furthermore the magnet member 3' is supported by means of the ball bearing 2' on the hub 11' of the clutch member 6'.

Figure 4:
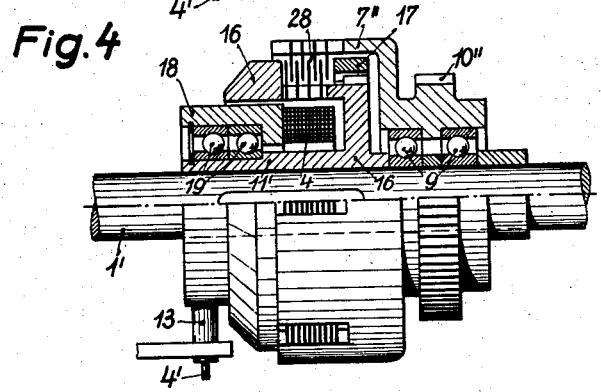

The basic arrangement in the embodiment of Fig. 4 is similar to that in the embodiment of Fig. 2. The fixed magnet member 18 is of annular construction and is mounted on the hub 11' by two ball bearings 19. The clutch member 16, which is formed in one integral piece with the hub 11" and is approximately U-shaped in cross-section, embraces the coil 4 and also partially embraces the magnet member 18. The annular armature 17 is, in contrast to Figs. 1 and 2, mounted in an axially displaceable manner on the outer side of the coupling member 16. The flow of mechanical forces extends through the fixed magnet member 18, across the coil 4, through the clutch member 16, the annular armature 17, the pile of discs 28, the first clutch member 16, the hub 11", and the two ball bearings 19 back to the magnetic member 18. The magnetic flux extends around the coil 4 through the magnet member 18, the hub 11''', the part of the clutch member 16 which joining the latter, the armature 17, through the pile of discs 28, to that part of the clutch member 16 which embraces the magnet part 18, and back to the magnet member 18.

The torque is transmitted either from the shaft 1' through the first clutch member 16, the packet of discs 28, the second clutch member 7''' and thus to the gear wheel 10", or in the opposite direction.

In the embodiment of Fig. 5 the hub 111 is not supported on the bearing of the fixed magnet member 20, which in this case is formed as a plain bearing 21, but is supported on the magnet member 20, itself, a ball bearing 23 being interposed, in order to reduce friction, between the rotary hub 111 and the shoulder 22 of the fixed magnet member 20. In this construction no torque-proof connection between the hub 111 and the armature 5" is provided. The latter is mounted on the hub loosely, i. e. rotatably, and is carried along by friction.

The construction according to Fig. 6 is similar to that according to Fig. 4 with the difference, however, that the fixed magnet member 18' encloses the magnet coil 24 on three sides and is mounted on the hub 111' of the first clutch member 16' by a roller bearing 19', the hub 111' being keyed to the shaft 36. On a non-magnetic ring 30 of the clutch member 16' the armature 17' is displaceably mounted. The packet of discs 28 comprises discs 38 carried by the ring 30 of the first clutch member, and discs 39 carried by a second clutch member 37, both discs 38 and 39 being mounted for relative movements in axial direction. The first clutch member 16' with the non-magnetic member 30 and the armature member 17' are concentrically arranged around the fixed magnet member 18' providing an annular air space 40. The courses of the flow of mechanical forces and of the magnetic flux and the transmission of the torque are as described with reference to Fig. 3. According to Figs. 8 and 9 the armature 17' is freely rotatable relative to the ring 30 and thus also the clutch member 16'.

Instead of coupling a through shaft as illustrated in the drawing, obviously two coaxial shafts, or two driving or driven elements, e. g. gear wheels, may be coupled by a clutch according to the invention, the shaft serving in the latter case only as a bearing body. Furthermore instead of a laminated disc clutch a different kind of friction clutch, for example a cone clutch, or else a dog clutch may be employed, and two clutches may be combined if desired to serve as a reversing clutch.

Having thus described our invention we are aware that numerous and extensive departures may be made therefrom, without departing from the spirit or scope of the invention.

We claim:

1. An electromagnetic clutch for use on a shaft, comprising a fixed magnet member, means for locating said magnet member around the shaft concentrically to the axis thereof, a magnet coil secured on said fixed magnet member, a first and a second clutch member, each including at least one disc mounted for relative movements in the direction of said axis, said disc of the said first clutch member being adapted to engage and to disengage said disc of the said second clutch member, said second clutch member and said disc of said second clutch member being mounted for independent rotation about the axis of said shaft, the said first clutch member being provided with a hub fixing said first clutch member to said shaft, an axially displaceable armature member, a non-magnetic member fixed to said first clutch member and carrying said armature member and said disc of said first clutch member, said fixed magnet member having a circular circumference and being journaled on said hub of said first clutch member, said first clutch member with said non-magnetic member and said armature member being concentrically arranged around the said fixed magnet member providing an annular air space between said fixed magnet member and said other members.

2. An electromagnetic clutch as claimed in claim 1, wherein said armature member is freely rotatable relative to the clutch member on which it is mounted.

References Cited in the file of this patent
UNITED STATES PATENTS

| | | |
|---|---|---|
| Re. 19,150 | Furnas | May 1, 1934 |
| 1,622,939 | Bing | Mar. 29, 1927 |
| 1,746,365 | Schunemann | Feb. 11, 1930 |
| 2,549,214 | Lilja | Apr. 17, 1951 |
| 2,732,725 | Brueder | Jan. 31, 1956 |

FOREIGN PATENTS

| | | |
|---|---|---|
| 472,567 | Germany | Mar. 2, 1929 |
| 629,311 | Great Britain | Sept. 16, 1949 |